(12) United States Patent
Lee et al.

(10) Patent No.: US 12,447,563 B2
(45) Date of Patent: Oct. 21, 2025

(54) WIRE ROD FOR WELDING RODS AND METHOD FOR MANUFACTURING SAME

(71) Applicant: POSCO, Pohang-si (KR)

(72) Inventors: Bong-Keun Lee, Pohang-si (KR); Sung-Hoon Chung, Pohang-si (KR)

(73) Assignee: POSCO, Pohang-si (KR)

( * ) Notice: Subject to any disclaimer, the term of this patent is extended or adjusted under 35 U.S.C. 154(b) by 601 days.

(21) Appl. No.: 17/765,777

(22) PCT Filed: Oct. 6, 2020

(86) PCT No.: PCT/KR2020/013581
§ 371 (c)(1),
(2) Date: Mar. 31, 2022

(87) PCT Pub. No.: WO2021/075777
PCT Pub. Date: Apr. 22, 2021

(65) Prior Publication Data
US 2022/0371131 A1 Nov. 24, 2022

(30) Foreign Application Priority Data
Oct. 16, 2019 (KR) .................. 10-2019-0128586

(51) Int. Cl.
*B23K 35/02* (2006.01)
*B23K 35/30* (2006.01)
(Continued)

(52) U.S. Cl.
CPC ...... *B23K 35/0261* (2013.01); *B23K 35/3066* (2013.01); *B23K 35/3073* (2013.01);
(Continued)

(58) Field of Classification Search
CPC ............ B23K 35/0261; B23K 35/3066; B23K 35/3073; B23K 35/40; B23K 35/3053;
(Continued)

(56) References Cited

U.S. PATENT DOCUMENTS 4,256,516 A 3/1981 Ouchi et al.
2013/0270246 A1 10/2013 Okazaki et al.
(Continued)

FOREIGN PATENT DOCUMENTS

| CN | 102649202 A | 8/2012 |
| CN | 104797730 A | 7/2015 |

(Continued)

OTHER PUBLICATIONS

International Search Report dated Feb. 18, 2021 issued in International Patent Application No. PCT/KR2020/013581 (with English translation).
(Continued)

*Primary Examiner* — Danielle M. Carda
(74) *Attorney, Agent, or Firm* — Morgan Lewis & Bockius LLP

(57) ABSTRACT

The purpose of the present invention is to provide, as a wire rod suitable for use as a substance for welding materials and, in particular, for welding rods, a wire rod for welding rods, having high tensile strength at room temperature and excellent drawing characteristics, and a manufacturing method therefor.

6 Claims, 3 Drawing Sheets

(51) Int. Cl.
*B23K 35/40* (2006.01)
*C21D 9/52* (2006.01)
*C22C 38/02* (2006.01)
*C22C 38/04* (2006.01)

(52) U.S. Cl.
CPC .............. *B23K 35/40* (2013.01); *C21D 9/525* (2013.01); *C22C 38/02* (2013.01); *C22C 38/04* (2013.01); *C21D 2211/001* (2013.01)

(58) Field of Classification Search
CPC .. C21D 9/525; C21D 2211/001; C21D 6/005; C21D 8/065; C21D 9/0075; C22C 38/02; C22C 38/04; C22C 38/001; C22C 38/12; C22C 38/22; C22C 38/38; C22C 38/44; C22C 38/46; C22C 38/58; B21B 1/16
USPC .......................................................... 420/72
See application file for complete search history.

(56) References Cited

U.S. PATENT DOCUMENTS

| | | |
|---|---|---|
| 2016/0271736 A1 | 9/2016 | Han et al. |
| 2016/0271739 A1* | 9/2016 | Lee .................... C22C 38/50 |
| 2016/0273083 A1* | 9/2016 | Lee .................... C22C 38/22 |
| 2016/0346877 A1 | 12/2016 | Zhaoxia et al. |
| 2017/0002435 A1 | 1/2017 | Jeong et al. |
| 2017/0312862 A1* | 11/2017 | Wasson ............... C22C 38/22 |
| 2018/0021895 A1* | 1/2018 | Wasson ............... C22C 38/50 |
| | | 420/73 |
| 2020/0071792 A1 | 3/2020 | Lee et al. |

FOREIGN PATENT DOCUMENTS

| | | |
|---|---|---|
| CN | 105829565 A | 8/2016 |
| CN | 110062813 A | 7/2019 |
| EP | 2592167 A1 | 5/2013 |
| EP | 3037205 A1 | 6/2016 |
| JP | S56-59597 A | 5/1981 |
| JP | 3175551 B2 | 6/2001 |
| JP | 2004-195542 A | 7/2004 |
| KR | 10-1997-0043187 A | 7/1997 |
| KR | 10-2009-0070149 A | 7/2009 |
| KR | 10-2010-0063542 A | 6/2010 |
| KR | 10-2013-0003685 A | 1/2013 |
| KR | 10-2013-0052523 A | 5/2013 |
| KR | 10-2015-0039225 A | 4/2015 |
| KR | 10-2015-0066372 A | 6/2015 |
| KR | 10-2015-0105623 A | 9/2015 |
| KR | 10-2016-0078621 A | 7/2016 |
| KR | 10-2018-0074860 A | 7/2018 |
| KR | 10-2019-0050926 A | 5/2019 |
| WO | 2018/117464 A | 6/2018 |
| WO | 2020/203334 A1 | 10/2020 |

OTHER PUBLICATIONS

Office Action issued in corresponding Chinese application 202080071743.1 dated Feb. 28, 2023 with English Translation.
Search Report issued in corresponding European application 20877049.5 dated Mar. 16, 2023.

* cited by examiner

[FIG. 1]
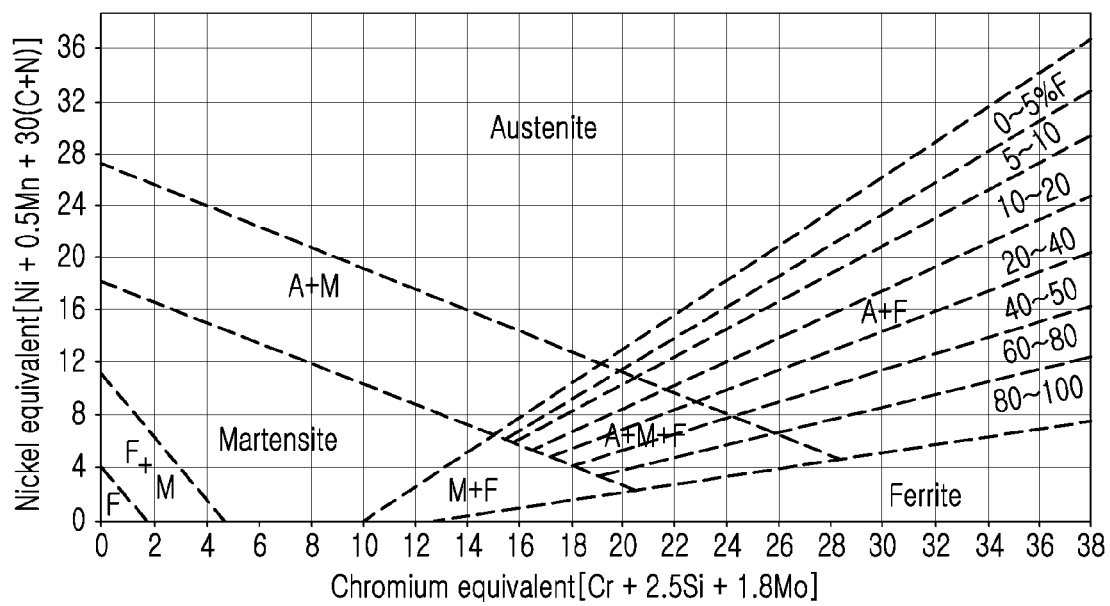

[FIG. 2]
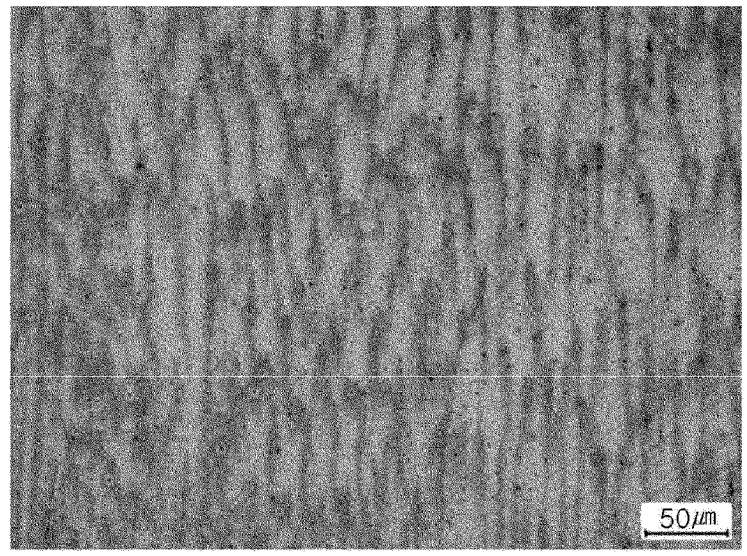
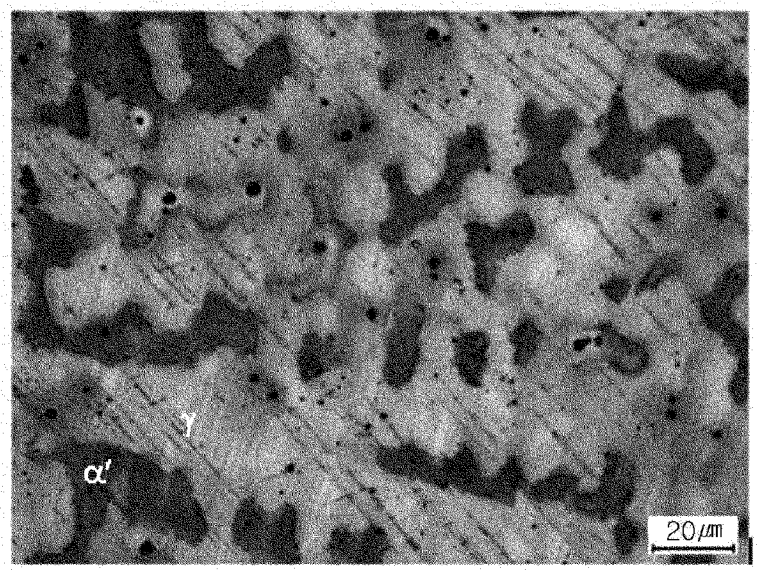

[FIG. 3]
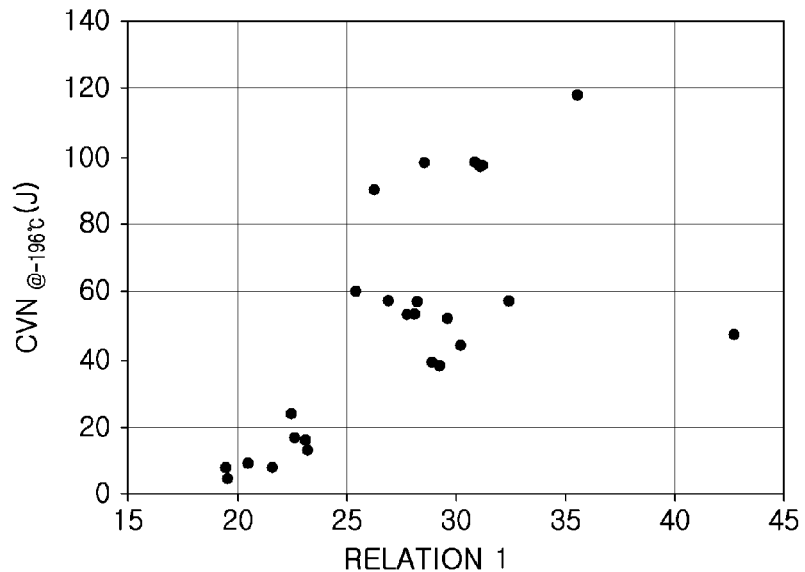
[FIG. 4]
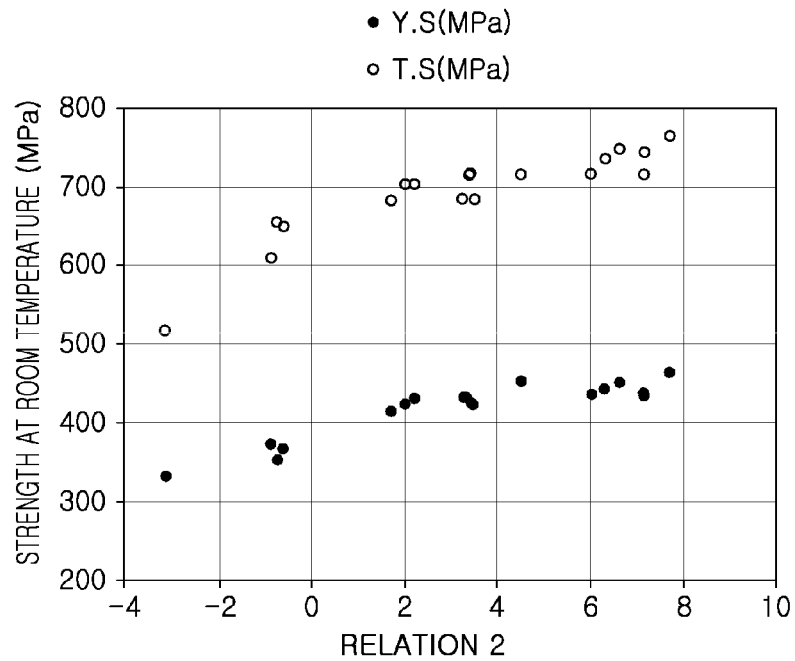

WIRE ROD FOR WELDING RODS AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/013581, filed on Oct. 6, 2020, which in turn claims the benefit of Korean Application No. 10-2019-0128586, filed on Oct. 16, 2019, the entire disclosures of which applications are incorporated by reference herein.

TECHNICAL FIELD

The present disclosure relates to a wire rod appropriate for a material for welding rods, and particularly, to a wire rod for welding rods having excellent strength at room temperature and excellent rod drawing properties and a method for manufacturing the same.

BACKGROUND ART

Usually, welding rods mainly use a wire rod as a material thereof, and the wire rod is manufactured by hot rolling and then rod drawing at room temperature. Here, the wire rod is drawn to a specific diameter and is produced as a material for submerged arc welding, shielded metal arc welding, gas metal arc welding, gas tungsten arc welding, and the like and applied.

A weld zone which is formed by performing welding of a base material by the welding method using the wire rod for welding rods is required to have high impact toughness, strength at room temperature, and the like, for the reason such as stability of a structure.

As an example, it is necessary for materials for a cryogenic (base material) use to satisfy a strength at room temperature of 400 MPa and a tensile strength of 660 MPa, while satisfying a guaranteed impact toughness value of a weld zone at the time of welding of about 27 J at −196° C. These are standard values of a material which is currently widely used, and when the standard values are satisfied, materials at a higher temperature such as −100° C. or −80° C. may be applied.

As a conventional material for welding materials, a wire rod including 50 wt % or more of nickel (Ni) with a total of more than 30 wt % of chromium (Cr) and molybdenum (Mo) for improving strength has been applied. As a representative example, provided are inconel and hastelloy materials.

These materials are currently widely used in a cryogenic environment, but since inconel and hastelloy are expensive products to which expensive alloy elements such as Ni, Cr, and Mo are applied in large amounts, an increase in construction costs in the industrial field may result.

Thus, development of a material for welding materials satisfying the physical property values of a base material weld zone, has excellent rod drawing properties at room temperature, and is economically favorable is demanded.

(Patent Document 1) Korean Patent Laid-Open Publication No. 10-2015-0039225
(Patent Document 2) Korean Patent Laid-Open Publication No. 10-2013-0052523

DISCLOSURE

Technical Problem

An aspect of the present disclosure is to provide a material for welding materials, in particular, a wire rod appropriate for a material for welding rods, which has excellent rod drawing properties, high tensile strength at room temperature of a weld zone after welding, and excellent cryogenic impact toughness.

An object of the present disclosure is not limited to the above description. The object of the present disclosure will be understood from the entire content of the present specification, and a person skilled in the art to which the present disclosure pertains will understand an additional object of the present disclosure without difficulty.

Technical Solution

According to an aspect of the present disclosure, a wire rod for welding rods includes, by weight: 0.05 to 0.8% of carbon (C), 18 to 31% of manganese (Mn), 0.05 to 0.7% of silicon (Si), 0.15% or less of nitrogen (N), 0.02% or less of phosphorus (P), and 0.01% or less of sulfur (S), with a balance of Fe and unavoidable impurities, wherein the following Relation 1 is satisfied:

$$Mn+1.6Ni+15(C+N)\geq 24 \quad \text{[Relation 1]}$$

wherein each element refers to a content by weight of the element.

According to another aspect of the present disclosure, a method for manufacturing a wire rod for welding rods includes: preparing a steel workpiece or an ingot satisfying the alloy composition described above and Relation 1; heat treating the steel workpiece or the ingot in a temperature range of 800 to 1250° C. to manufacture a billet; and subjecting the billet to wire rod rolling in a temperature range of 800 to 1250° C. to manufacture a wire rod.

Advantageous Effects

As set forth above, according to an exemplary embodiment in the present disclosure, a wire rod having the physical properties required as a material for welding rods may be provided at low cost.

In particular, the present disclosure may provide a wire rod which has excellent strength at room temperature and excellent cryogenic impact toughness of a weld zone after welding and has excellent rod drawing properties of a tensile strength of 850 MPa or less at room temperature and an elongation of 30% or more, though the use of expensive elements which have been mainly used for manufacturing a conventional wire rod for welding rods are greatly decreased. Thus, the wire rod of the present disclosure may be favorably applied as a wire rod for welding rods.

DESCRIPTION OF DRAWINGS

FIG. 1 illustrates a Schaeffler diagram (source: published in 1948 (A. L. Schaeffler, Iron Age 162, 72 (1948)).

FIG. 2 is photographs of a microstructure in a weld zone of the comparative examples and the inventive examples according to an exemplary embodiment in the present disclosure.

FIG. 3 shows a relationship between [Relation 1] and cryogenic impact toughness of a weld zone, according to an exemplary embodiment in the present disclosure, as a graph.

FIG. 4 shows a relationship between [Relation 2] and toughness at room temperature of a weld zone, according to an exemplary embodiment in the present disclosure, as a graph.

BEST MODE FOR INVENTION

The present inventors confirmed a limitation of conventional materials used as a welding rod, and intensively studied in order to develop a material which allows the physical property values required for a weld zone to be secured at low cost and has excellent rod drawing properties.

As a result, it was confirmed that low cost elements were used instead of high cost elements which have been used for manufacturing a conventional material for welding rods, thereby providing a wire rod which may form a weld zone having equivalent or better physical properties as compared with a conventional material while greatly lowering manufacturing costs, and thus, the present disclosure has been completed.

In particular, since the wire rod for welding rods is manufactured by rod drawing at room temperature of a wire rod obtained by hot rolling, it requires to have excellent processability at room temperature, and for this, the present disclosure has a technical significance in optimizing a component system by properly using elements stable at room temperature.

Specifically, it was confirmed that processability at room temperature depends on austenite stability of an alloy element and a processing type at the time of rod drawing, and the present disclosure is characterized in that carbon (C), nickel (Ni), manganese (Mn), nitrogen (N), and the like as appropriate elements therefor are controlled to appropriate contents, while a content relationship among them is suggested.

Hereinafter, the present disclosure will be described in detail.

The wire rod for welding rods according to an aspect of the present disclosure may include, by weight: 0.05 to 0.8% of carbon (C), 18 to 31% of manganese (Mn), 0.05 to 0.7% of silicon (Si), 0.15% or less of nitrogen (N), 0.02% or less of phosphorus (P), and 0.01% or less of sulfur (S).

Hereinafter, the reason that the alloy composition of the wire rod for welding rods provided in the present disclosure is limited as described above will be described in detail.

Meanwhile, unless otherwise particularly stated in the present disclosure, the content of each element is by weight and the ratio of the structure is by area.

Carbon (C): 0.05 to 0.8%

Carbon (C) is an austenite forming element, and is favorable for improving impact toughness of a weld zone in a cryogenic environment and improving strength at room temperature.

When the content of C is less than 0.05%, it is difficult to secure the targeted strength at room temperature, but when the content is more than 0.8%, occurrences of cracks at high temperature, welding fumes, and spatter are promoted during welding.

Therefore, C may be included at 0.05 to 0.8%, and more favorably at 0.78% or less.

Manganese (Mn): 18 to 31%

Manganese (Mn) is an element forming austenite, which is similar to C, and is an element favorable for improving impact toughness at cryogenic temperature.

When the content of Mn is less than 18%, impact toughness is deteriorated by stress organic transformation at cryogenic temperature, but when the content is more than 31%, strength is lowered and a large amount of fumes is caused.

Therefore, Mn may be included at 18 to 31%.

Silicon (Si): 0.05 to 0.7%

Silicon (Si) is an element added for improving flowability of welding materials at the time of welding, and is favorable to a deoxidation effect. In order to sufficiently obtain the effect described above, Si may be included at 0.05% or more. However, when the content is more than 0.7%, an eutectic compound is excessively precipitated and crack resistance is deteriorated.

Therefore, Si may be included at 0.05 to 0.7%.

Nitrogen (N): 0.15% or Less

Nitrogen (N) is an austenite forming element which is similar to C, and is effective in improving impact toughness of a weld zone in a cryogenic environment and improve strength at room temperature. Thus, in the present disclosure, N may be further added in terms of further promoting the effect of strength improvement by C.

When the content of N is more than 0.15%, occurrences of cracks at a high temperature and pores are promoted during welding, and thus, considering the fact, N may be included at 0.15% or less. However, 0% may be fine.

Phosphorus (P): 0.02% or Less and Sulfur (S): 0.01% or Less

Phosphorus (P) and sulfur (S) easily produce a low-melting point compound by addition in a small amount to lower the melting point of a material, thereby increasing cracking susceptibility at a high temperature. Thus, it is preferred that the contents of P and S are greatly decreased as much as possible.

P and S may be inevitably added during the manufacturing process, and when each content is 0.02% or less and 0.01% or less, the physical properties of the wire rod are not influenced, and thus, each content may be limited as such.

The wire rod of the present disclosure may further include elements favorable for forming the structure and securing the physical properties, in addition to the alloy composition described above.

Specifically, the wire rod of the present disclosure may further include one or more of nickel (Ni), chromium (Cr), molybdenum (Mo), and vanadium (V), as described later. However, even in the case in which these elements are not included, it will not be difficult to form the structure and secure the physical properties in the present disclosure.

Nickel (Ni): 8% or Less

Nickel (Ni) is an austenite forming element, and may be added for forming the structure of the wire rod completely into an austenite structure to secure cryogenic toughness.

When the content of Ni is more than 8%, strength at room temperature is lowered, which is thus not preferred. Therefore, Ni may be included at 8% or less.

Meanwhile, in the present disclosure, in the case in which the structure of the wire rod is completely formed into austenite by sufficiently including C, Mn, N, and the like described above, Ni may not be included.

Chromium (Cr): 3.5% or Less

Chromium (Cr) is a ferrite forming element, and promotes production of ferrite to serve to expand an austenite area (FIG. 1). Thus, the higher content of Cr is favorable for improving strength at room temperature, but when Cr is added more than a specific content, Cr tends to be bonded to C to produce a carbide to cause cryogenic impact toughness to be lowered.

Thus, when Cr is added, Cr may be included up to 3.5% for improving strength at room temperature and austenite stability.

Molybdenum (Mo): 3.5% or Less

Molybdenum (Mo) has a better effect of improving strength at room temperature than Cr, and has a lower bonding strength to C than Cr, and thus, when added, the cryogenic impact toughness is less lowered than Cr. However, Mo is an expensive element, and when added at a specific amount or more, manufacturing costs are greatly increased, and deterioration of cryogenic impact toughness may be caused.

Therefore, when Mo is added, considering the manufacturing costs and strength improvement, Mo may be included up to 3.5%.

Vanadium (V): 3.5% or Less

Vanadium (V) has a better effect of improving strength at room temperature than Cr and Mo. However, since the price of V is 10 times or more higher than the price of Cr and 4 times or more higher than the price of Mo, and thus, V has a limitation in obtaining a low cost material.

Thus, when V is added, considering the manufacturing costs, V may be included up to 0.3%.

The remaining component of the present disclosure is iron (Fe). However, since in the common manufacturing process, unintended impurities may be inevitably incorporated from raw materials or the surrounding environment, the component may not be excluded. Since these impurities are known to those skilled in the common manufacturing process, the entire contents thereof are not particularly mentioned in the present specification.

It is preferred that the wire rod of the present disclosure having the alloy composition described above satisfies the following component relation within the content range.

First, in the present disclosure, the relationship among the elements favorable to austenite formation is suggested as the following [Relation 1], and the value of 24 or more is preferred.

Second, in the present disclosure, while the austenite structure is illustrated, the relationship among the elements which may have strength at or above a targeted level is suggested as the following [Relation 2], and the value of 0 or more is preferred.

$$Mn+1.6Ni+15(C+N) \geq 24 \quad \text{[Relation 1]}$$

$$10(C+N)+1.5Cr+2Mo+1.5V-0.1Mn-0.16Ni \geq 0 \quad \text{[Relation 2]}$$

wherein each element refers to a content by weight of the element.

In general, the austenite stability of a steel is calculated by a Schaeffler diagram, as values of a Ni equivalent and a Cr equivalent. The equations for the Ni equivalent and the Cr equivalent are known as [Ni+0.5Mn+30(C+N)] and [Cr+2.5Si+1.8Mo].

However, since the wire rod of the present disclosure is completely different from the conventional material including large amounts of Ni, Cr, and the like and is formed of a novel component composition, the relationship among the alloy elements was intended to be redefined.

Thus, the present disclosure defines [Relation 1] and [Relation 2] described above and provides a wire rod satisfying the same, thereby providing a wire rod for welding rods which has a somewhat low tensile strength at room temperature in the state of a wire rod to have excellent rod drawing properties, has a target level or more of tensile strength at room temperature after welding, and may form a weld zone having physical properties required in a cryogenic environment.

In particular, the structure of a wire rod manufactured by satisfying the value of [Relation 1] in the alloy component system suggested in the present disclosure may be formed into stable austenite, whereby a strength of 850 MPa or less and an elongation of 30% or more are illustrated, and thus, rod drawing properties are excellent and austenite may be stably secured even in a weld zone after welding. That is, in the present disclosure, a wire rod in which both the structure of the wire rod and the structure of the weld joint after welding using the wire rod have the austenite structure may be provided.

The present disclosure may obtain an effect of securing a cryogenic (−197° C.) impact toughness of a weld zone formed at the time of welding of 27 J or more, therefrom.

Furthermore, the present disclosure satisfies [Relation 2] within the limited contents in using Ni, Cr, Mo, and V for sufficiently improving the strength at room temperature of the wire rod, thereby securing strength at room temperature while structurally maintaining an austenite phase after welding.

That is to say, the present disclosure satisfies the alloy component system and Relations 1 and 2 as suggested, whereby the microstructure of the weld zone after welding is formed of an austenite single phase structure to have excellent cryogenic toughness and provide a wire rod having excellent room temperature strength properties.

Moreover, the wire rod of the present disclosure has an austenite structure at room temperature to show a tensile strength of 850 MPa or less and an elongation of 30% or more, which correspond to the mechanical properties allowing rod drawing processing for being manufactured into a welding rod, and thus, the wire rod is favorable to processing at room temperature.

Hereinafter, a method for manufacturing a wire rod for welding rods according to another aspect of the present disclosure will be described in detail.

First, a steel workpiece or an ingot satisfying the alloy composition and the component relation (Relations 1 and 2) described above is prepared, and then is heat treated in a temperature range of 800 to 1250° C., thereby manufacturing a billet.

When the temperature is lower than 800° C. in the heat treatment, hot deformation resistance is increased to cause a decrease in productivity, but when the temperature is higher than 1250° C., crystal grains may become coarsened to reduce toughness.

The heat-treated billet may be subjected to wire rod rolling to obtain a wire rod.

Here, the wire rod rolling is carried out as hot rolling and may be carried out in a temperature range of 800 to 1250° C. When the temperature is lower than 800° C. in the hot rolling, a load is increased during the rolling and deformation resistance may be increased, but when the temperature is higher than 1250° C., crystal grains may be excessively coarsened to reduce toughness.

As described above, hot rolling and then cooling to room temperature are performed, thereby obtaining a wire rod having targeted microstructure and mechanical properties.

Here, since the cooling may depend on the conditions applied in the manufacturing process of a common wire rod, it is not particularly limited in the present disclosure, and those skilled in the art may easily carry out it. However, as an example, the cooling may be performed as water cooling, at a cooling rate of 5° C./s or more.

A final wire rod manufactured by the alloy composition and the manufacturing conditions suggested in the present disclosure has an austenite phase having high stability as a microstructure, thereby having strength at room temperature and elongation to allow rod drawing, and thus, is favorable to rod drawing processing. Furthermore, the wire rod may have a characteristic of forming a weld zone having excellent cryogenic impact toughness and tensile properties at room temperature at the time of welding.

Here, the welding is not specifically limited, but may be any one of submerged arc welding (SAW), shielded metal arc welding (SMAW), gas tungsten arc welding (GTAW), and gas metal arc welding (GMAW).

Hereinafter, the present disclosure will be specifically described through the following Examples. However, it should be noted that the following Examples are only for describing the present disclosure in detail by illustration, and are not intended to limit the right scope of the present disclosure. The reason is that the right scope of the present disclosure is determined by the matters described in the claims and reasonably inferred therefrom.

MODE FOR INVENTION

Examples

An ingot having the alloy composition illustrated in the following Table 1 was prepared, and then heated at 1250° C. to manufacture a billet. Immediately after the heating, the billet was hot rolled to a diameter of 5.5 mm at 800 to 1250° C., and then water cooled at a cooling rate of 5° C./s or more to manufacture a wire rod having a diameter of 5.5 mm.

In order to confirm the tensile properties of the wire rod manufactured as described above, a tensile specimen was manufactured according to the standard of JIS No. 5, yield strength (TS) and tensile strength (TS) were measured at a rate of 40 mm/min at room temperature (about 25 to 30° C.) with a tensile testing machine (Zwick/Roell), and the results are illustrated in Table 2.

In addition, a microstructure for the same specimen as the tensile specimen was measured, and the type of phase was confirmed by measurement with an image analyzer (Olympus).

Thereafter, each wire rod was subjected to rod drawing to a diameter of 4 mm. At this time, a process of heat treatment at 800 to 1250° C. was performed, and if necessary, the rod drawing was performed under a reducing atmosphere environment containing hydrogen.

While the wire rod which has been subjected to rod drawing was used as a welding rod, a high-manganese steel (a material to be welded, 0.4% of C—24% of Mn—0.3% of Si—a balance of Fe and unavoidable impurities, % by weight) was subjected to submerged arc welding at a heat input of 3.0 kJ/mm and the physical properties of deposited metal (weld metal) were evaluated.

As the strength properties of the deposited metal, a tensile specimen was collected in a rod shape along the center in a direction of a welding line, and then yield strength (YS) and tensile strength (TS) were measured at room temperature (about 25 to 30° C.) at a rate of 40 mm/min with a tensile testing machine (Zwick/Roell).

In addition, a microstructure for the same specimen as the tensile specimen was measured, and the type of phase was confirmed by measurement with an image analyzer (Olympus).

Then, the impact properties of the deposited metal were measured by collecting a standard specimen (KS B0809V notch specimen) in the center of the deposited metal perpendicular to the welding line, and then using a Charpy impact tester at −196° C.

Each measurement result is illustrated in the following Table 2.

TABLE 1

| Classification | Alloy composition (wt %) | | | | | | | | | | [Relation] | |
| --- | --- | --- | --- | --- | --- | --- | --- | --- | --- | --- | --- | --- |
| | C | Mn | Si | N | P | S | Ni | Cr | Mo | V | 1 | 2 |
| Comparative Example 1 | 0.26 | 15.10 | 0.14 | 0 | 0.0127 | 0.0050 | 0.34 | 1.29 | 0.52 | 0 | 19.54 | 4.01 |
| Comparative Example 2 | 0.25 | 15.20 | 0.15 | 0 | 0.0120 | 0.0051 | 0.33 | 2.07 | 0 | 0 | 19.48 | 4.03 |
| Comparative Example 3 | 0.25 | 15.90 | 0.14 | 0 | 0.0110 | 0.0047 | 1.22 | 0.48 | 0 | 0 | 21.60 | 1.43 |
| Comparative Example 4 | 0.26 | 14.90 | 0.12 | 0 | 0.0128 | 0.0044 | 1.06 | 1.38 | 0.47 | 0 | 20.50 | 3.95 |
| Comparative Example 5 | 0.25 | 16.30 | 0.16 | 0 | 0.0118 | 0.0048 | 1.98 | 0.62 | 0 | 0 | 23.22 | 1.48 |
| Comparative Example 6 | 0.10 | 15.75 | 0.56 | 0 | 0.0070 | 0.0110 | 3.70 | 1.21 | 0.03 | 0 | 23.17 | 0.71 |
| Comparative Example 7 | 0.25 | 15.70 | 0.20 | 0 | 0.0118 | 0.0064 | 1.99 | 0.59 | 0 | 0 | 22.63 | 1.50 |
| Comparative Example 8 | 0.09 | 16.37 | 0.37 | 0 | 0.0040 | 0.0140 | 2.99 | 1.28 | 0.04 | 0 | 22.50 | 0.78 |
| Comparative Example 9 | 0.20 | 20.90 | 0.21 | 0 | 0.0120 | 0.0080 | 3.98 | 0 | 0 | 0 | 30.27 | −0.73 |
| Comparative Example 10 | 0.20 | 21.10 | 0.22 | 0 | 0.0110 | 0.0090 | 3.01 | 0 | 0 | 0 | 28.92 | −0.59 |
| Comparative Example 11 | 0.09 | 21.46 | 0.29 | 0 | 0.0030 | 0.0130 | 3.31 | 0.57 | 0.03 | 0 | 28.10 | −0.86 |
| Comparative Example 12 | 0.01 | 32.32 | 0.26 | 0 | 0.0120 | 0.0100 | 0 | 0 | 0 | 0 | 32.47 | −3.13 |
| Inventive Example 1 | 0.56 | 20.82 | 0.05 | 0 | 0 | 0 | 0 | 0 | 0 | 0 | 29.22 | 3.52 |
| Inventive Example 2 | 0.13 | 18.93 | 0.66 | 0 | 0.0090 | 0.0090 | 2.85 | 0.98 | 0.65 | 0 | 25.44 | 1.72 |
| Inventive Example 3 | 0.19 | 21.70 | 0.43 | 0 | 0.0100 | 0.0060 | 3.17 | 1.30 | 0.53 | 0 | 29.62 | 2.23 |
| Inventive Example 4 | 0.78 | 18.72 | 0.50 | 0 | 0.0145 | 0.0021 | 7.68 | 1.63 | 0.01 | 0 | 42.71 | 7.16 |
| Inventive Example 5 | 0.19 | 20.20 | 0.47 | 0 | 0.0090 | 0.0045 | 3.23 | 1.07 | 0.54 | 0 | 28.22 | 2.05 |

TABLE 1-continued

| Classification | Alloy composition (wt %) | | | | | | | | | | [Relation] | |
| --- | --- | --- | --- | --- | --- | --- | --- | --- | --- | --- | --- | --- |
| | C | Mn | Si | N | P | S | Ni | Cr | Mo | V | 1 | 2 |
| Inventive Example 6 | 0.36 | 21.50 | 0.45 | 0 | 0.0170 | 0.0040 | 0.02 | 2.95 | 0.64 | 0 | 26.93 | 7.15 |
| Inventive Example 7 | 0.05 | 22.22 | 0.29 | 0 | 0.0089 | 0.0060 | 2.09 | 2.06 | 1.01 | 0.22 | 26.31 | 3.38 |
| Inventive Example 8 | 0.37 | 22.06 | 0.29 | 0 | 0.0025 | 0.0070 | 2.07 | 3.05 | 1.00 | 0 | 30.92 | 7.74 |
| Inventive Example 9 | 0.10 | 23.75 | 0.30 | 0 | 0.0025 | 0.0080 | 2.08 | 2.06 | 1.02 | 0 | 28.58 | 3.42 |
| Inventive Example 10 | 0.15 | 24.77 | 0.29 | 0.05 | 0.0082 | 0.0090 | 2.04 | 1.98 | 1.02 | 0.20 | 31.03 | 4.51 |
| Inventive Example 11 | 0.15 | 24.00 | 0.29 | 0.10 | 0.0085 | 0.0090 | 2.05 | 3.01 | 1.00 | 0 | 31.03 | 6.30 |
| Inventive Example 12 | 0.25 | 24.22 | 0.30 | 0 | 0.0024 | 0.0090 | 2.06 | 3.06 | 1.02 | 0.16 | 31.27 | 6.62 |
| Inventive Example 13 | 0.31 | 30.93 | 0.34 | 0 | 0.0170 | 0.0060 | 0 | 0 | 3.01 | 0 | 35.58 | 6.03 |
| Inventive Example 14 | 0.22 | 19.90 | 0.20 | 0 | 0.0110 | 0.0090 | 2.89 | 1.40 | 0.70 | 0 | 27.82 | 3.25 |

TABLE 2

| | | Wire rod | | | Weld zone | |
| --- | --- | --- | --- | --- | --- | --- |
| Classification | Wire rod and weld zone microstructure | Yield strength (MPa) | Tensile strength (MPa) | Impact toughness (J) | Yield strength (MPa) | Tensile strength (MPa) |
| Comparative Example 1 | α' + γ | 172 | 611 | 5 | 183 | 579 |
| Comparative Example 2 | α' + γ | 168 | 468 | 8 | 183 | 452 |
| Comparative Example 3 | α' + γ | 192 | 630 | 8 | 196 | 579 |
| Comparative Example 4 | α' + γ | 191 | 635 | 9 | 206 | 579 |
| Comparative Example 5 | α' + γ | 233 | 670 | 13 | 257 | 625 |
| Comparative Example 6 | α' + γ | 359 | 646 | 16 | 395 | 613 |
| Comparative Example 7 | α' + γ | 242 | 713 | 17 | 260 | 651 |
| Comparative Example 8 | α' + γ | 365 | 566 | 24 | 384 | 566 |
| Comparative Example 9 | γ | 330 | 673 | 44 | 352 | 653 |
| Comparative Example 10 | γ | 339 | 687 | 39 | 366 | 648 |
| Comparative Example 11 | γ | 357 | 642 | 53 | 372 | 607 |
| Comparative Example 12 | γ | 325 | 541 | 57 | 331 | 517 |
| Inventive Example 1 | γ | 409 | 697 | 38 | 420 | 682 |
| Inventive Example 2 | γ | 389 | 720 | 60 | 412 | 680 |
| Inventive Example 3 | γ | 403 | 743 | 52 | 432 | 702 |
| Inventive Example 4 | γ | 404 | 766 | 30 | 433 | 742 |
| Inventive Example 5 | γ | 404 | 718 | 57 | 423 | 702 |
| Inventive Example 6 | γ | 428 | 784 | 57 | 437 | 715 |
| Inventive Example 7 | γ | 432 | 722 | 90 | 432 | 713 |
| Inventive Example 8 | γ | 434 | 827 | 98 | 463 | 762 |
| Inventive Example 9 | γ | 414 | 785 | 98 | 425 | 715 |
| Inventive Example 10 | γ | 437 | 771 | 97 | 452 | 715 |
| Inventive Example 11 | γ | 404 | 798 | 97 | 442 | 732 |

TABLE 2-continued

| Classification | Wire rod and weld zone microstructure | Wire rod | | | Weld zone | |
| --- | --- | --- | --- | --- | --- | --- |
| | | Yield strength (MPa) | Tensile strength (MPa) | Impact toughness (J) | Yield strength (MPa) | Tensile strength (MPa) |
| Inventive Example 12 | γ | 435 | 753 | 97 | 449 | 745 |
| Inventive Example 13 | γ | 407 | 764 | 118 | 435 | 715 |
| Inventive Example 14 | γ | 427 | 689 | 53 | 432 | 683 |

(In Table 2, α' refers to alpha prime martensite and γ refers to an austenite phase.)

As illustrated in Tables 1 and 2, in Inventive Examples 1 to 14 satisfying [Relation 1] and [Relation 2] in the alloy component system suggested in the present disclosure, it was confirmed that not only the wire rod but also the weld zone structure after welding were all formed as an austenite single phase structure, and a strength favorable to rod drawing (a tensile strength of 850 MPa or less) was illustrated. In addition, though not described, the wire rod of the present disclosure (Inventive Examples 1 to 14) all had an elongation of 30% or more.

Besides, when the wire rod was drawn and then was used as a welding rod to perform welding, it was confirmed that a weld zone having excellent cryogenic impact toughness and excellent strength at room temperature may be obtained.

However, Inventive Example 4 having a relatively low Mn content but a high C content as compared with other inventive examples exhibited a somewhat low impact toughness of a weld zone of 30 J, but was confirmed to exceed the required physical properties. This is predicted to be due to the fact that when the content of manganese (Mn) in the wire rod is low due to the characteristic of carbon (C) of being solid solubilized in manganese (Mn), carbon is not entirely solid solubilized and is partly present as a carbide.

However, in Comparative Examples 1 to 8 in which the content of manganese (Mn) was less than 18% and the value of [Relation 1] was less than 24, it was confirmed that a martensite phase was structurally partly formed though the value of [Relation 2] was 0 or more. Thus, a weld zone having the cryogenic impact toughness at the time of welding of less than 27 J and the strength at room temperature not satisfying the target was formed. This exhibited the results in which in the tensile test at room temperature, the martensite structure was first broken to deteriorate strength.

Meanwhile, in Comparative Examples 9 to 12 including 18% or more of manganese (Mn), an austenite single phase structure was structurally formed, thereby obtaining a weld zone having a cryogenic impact toughness of 27 J or more. However, these all exhibited the value of [Relation 2] suggested in the present disclosure of less than 0, which means that the strength at room temperature in the weld zone was inferior.

FIG. 2 is photographs of a microstructure of a weld zone formed after welding using the wire rod corresponding to Inventive Example 7 and Comparative Example 1, and it is confirmed that in Comparative Example 1 (bottom), an austenite phase and a martensite phase were formed in a mixture, but in Inventive Example 7 (top), an austenite single phase structure was formed. Black dot shapes illustrated in FIG. 2 are oxides produced during welding.

FIG. 3 is a graph showing a relationship between [Relation 1] suggested in the present disclosure and the cryogenic impact toughness of the weld zone.

As illustrated in FIG. 3, it was found that in the alloy component system limited in the present disclosure, only when the value of [Relation 1] is 25 or more, a weld zone having the cryogenic impact toughness at −196° C. of 27 J or more may be obtained.

FIG. 4 is a graph of a relationship between [Relation 2] suggested in the present disclosure and the strength at room temperature of the weld zone.

As illustrated in FIG. 4, it was found that in the alloy component system limited in the present disclosure, only when the value of [Relation 2] is 0 or more, a weld zone having a yield strength of 400 MPa or more and a tensile strength of 660 MPa or more may be obtained.

This shows that in order to appropriately apply the alloy component system limited in the present disclosure, that is, the wire rod including specific amounts of carbon, manganese, and the like as a welding rod, [Relation 1], and furthermore [Relation 2] according to the present disclosure should be satisfied.

Also, high-priced elements which have been mainly used for manufacturing a conventional wire rod for welding rods are greatly reduced, thereby providing the wire rod having the required physical properties as the material for welding rods at low costs.

The invention claimed is:

1. A wire rod for welding rods comprising, by weight:
0.05 to 0.37% of carbon (C),
18 to 31% of manganese (Mn),
0.05 to 0.7% of silicon (Si),
0.1% or less or nitrogen (N),
0.02% or less of phosphorus (P),
0.01% or less of sulfur(S),
one or more selected from the group consisting of:
8% or less of nickel (Ni),
2.95% or less of chromium (Cr),
2.5% or less of molybdenum (Mo), and
0.3% or less of vanadium (V), and
a balance of Fe and unavoidable impurities,
wherein the following Relation 1 is satisfied:

$$Mn+1.6Ni+15(C+N) \geq 24, \quad \text{[Relation 1]}$$

wherein the following Relation 2 is satisfied:

$$10(C+N)+1.5Cr+2Mo+1.5V-0.1Mn-0.16Ni \geq 0, \text{ and} \quad \text{[Relation 2]}$$

wherein each element in the Relations 1 and 2 refers to a content by weight of the element, and wherein when welding is performed using the wire rod, a weld zone having a Charpy impact toughness at −196° C. of 27 J or more is formed.

2. The wire rod for welding rods of claim 1, wherein the wire rod includes an austenite single phase structure as a microstructure.

3. The wire rod for welding rods of claim 1, wherein the wire rod has a tensile strength at room temperature of 850 MPa or less.

4. The wire rod for welding rods of claim 1, wherein when welding is performed using the wire rod, a weld zone having a yield strength at room temperature of 400 MPa or more and a tensile strength at room temperature of 660 MPa or more is formed.

5. The wire rod for welding rods of claim 4, wherein the welding is any one of submerged arc welding (SAW), shielded metal arc welding (SMAW), gas tungsten arc welding (GTAW), and gas metal arc welding (GMAW).

6. A method for manufacturing the wire rod for welding rods of claim 1, the method comprising:
 preparing a steel workpiece or an ingot which includes, by weight: 0.05 to 0.37% of carbon (C), 18 to 31% of manganese (Mn), 0.05 to 0.7% of silicon (Si), 0.1% or less of nitrogen (N), 0.02% or less of phosphorus (P), and 0.01% or less of sulfur(S), and one or more selected from the group consisting of 8% or less of nickel (Ni), 2.95% or less of chromium (Cr), 3.5% or less of molybdenum (Mo), and 0.3% or less of vanadium (V), with a balance of Fe and unavoidable impurities and satisfies the following Relation 1 and Relation 2:
 heat treating the steel workpiece or the ingot in a temperature range of 800 to 1250° C. to manufacture a billet, and
 subjecting the billet to wire rod rolling in a temperature range of 800 to 1250° C. to manufacture the wire rod:
 [Relation 1] $Mn+1.6Ni+15(C+N) \geq 24$ wherein each element refers to a content by weight of the element and
 [Relation 2] $10(C+N)+1.5Cr+2Mo+1.5V-0.1Mn-0.16Ni \geq 0$ wherein each element refers to a content by weight of the element.

* * * * *